F. H. CLIFT.
APPARATUS FOR MEASURING THE QUANTITY OF LIQUID IN OPEN AND CLOSED VESSELS.
APPLICATION FILED MAR. 28, 1917.
1,237,478.
Patented Aug. 21, 1917.
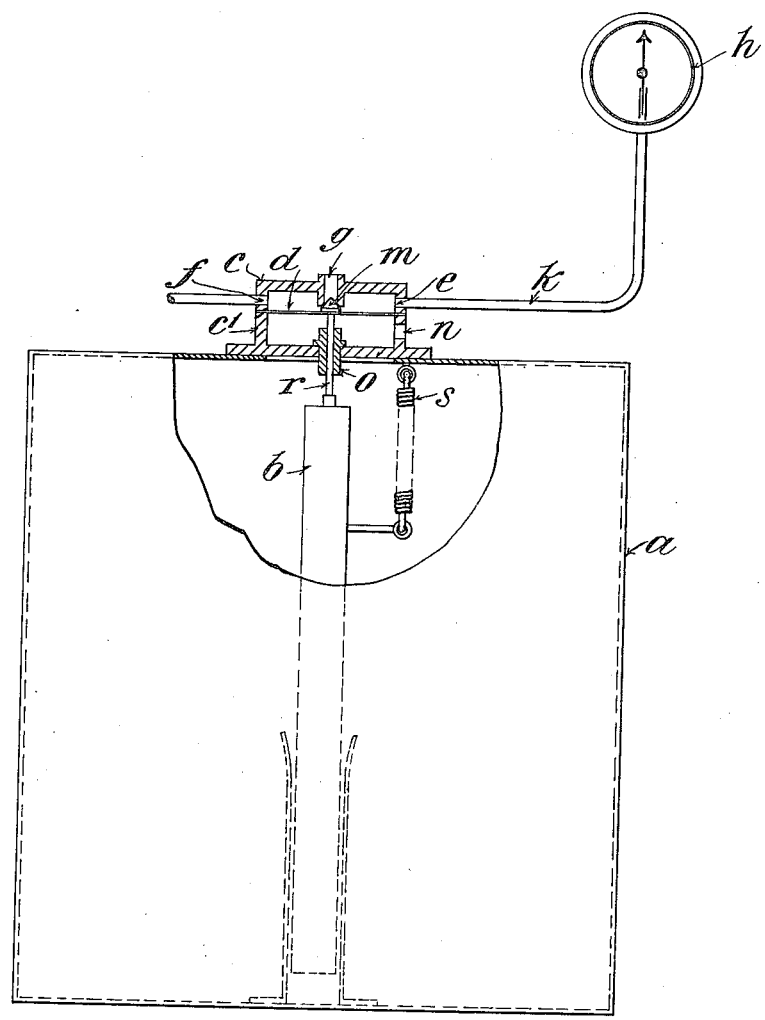
INVENTOR.
F. H. Clift.
Per Robert O. Phillips.
Attorney.

UNITED STATES PATENT OFFICE.

FREDERIC HOLLOCOOMBE CLIFT, OF BARNES, ENGLAND.

APPARATUS FOR MEASURING THE QUANTITY OF LIQUID IN OPEN AND CLOSED VESSELS.

1,237,478.     Specification of Letters Patent.     Patented Aug. 21, 1917.

Application filed March 28, 1917. Serial No. 158,072.

*To all whom it may concern:*

Be it known that I, FREDERIC HOLLOCOOMBE CLIFT, a subject of the King of Great Britain and Ireland, residing at Barnes, Surrey, England, have invented a certain new and useful Apparatus for Measuring the Quantity of Liquid in Open and Closed Vessels, of which the following is a specification.

This invention relates to an improved apparatus for measuring the quantity of liquid in vessels, and it has for its object to simplify the apparatus necessary for this purpose and to avoid the variations of pressure which arise in existing apparatus due to variations in temperature or in barometric pressure.

I attain this end by causing the varying levels of the liquid in the vessel to control the leakage of air from a box or chamber which is in communication with a pressure gage and into which air under pressure is admitted.

In the accompanying drawing which illustrates this invention—

The figure is a diagrammatic view showing—by way of example—a convenient form of construction of the apparatus for carrying this invention into practice.

In the vessel $a$ adapted to contain the liquid the quantity of which it is desired at any time to measure, is a buoyant body $b$—hereinafter for convenience called a float—which is guided in any suitable manner, such as is shown in the accompanying drawing, so that it has a vertical or approximately vertical motion in said vessel. On the top of the vessel is mounted a box—hereinafter called a pressure box—which for convenience is formed in two parts, an upper part $c$ and a lower part $c^1$. The two parts are divided by a flexible diaphragm $d$. In the upper part $c$ of the box are three orifices or ports one of which $e$ is in communication with the pressure gage $h$ by means of a suitable pipe $k$, another of which $f$ is an air inlet which is in communication with a source of supply of air under slight pressure, and the other of which $g$ is an outlet which is open to the atmosphere. This latter port ($g$) is shaped on its inner side to form a seating for a valve $m$ which is carried by the flexible diaphragm $d$ and is adapted to form an escape valve. The lower part $c^1$ of the pressure box is open to the atmosphere by means of a port $n$. This part of the box carries a bush $o$ which forms a guide for a spindle $r$ which is connected to both the float $b$ and the diaphragm $d$, the function of said rod being to impart the movement of the float $b$ to the valve $m$.

The air inlet port $f$, though preferably located in the box $c$, can be located in any other suitable part of the circuit between the pressure box and the pressure gage, for instance in the pipe $k$.

As no material which can be practically used for the float is sufficiently buoyant to operate without any submergence, it follows that there must be a certain depth of fluid at the bottom of the tank which cannot be measured. To reduce this to a minimum the float is relieved of this non-buoyant weight by balancing it by means of a spring $s$ the strength of which is sufficient to just keep the valve $m$ up in contact with the seating in the port $g$.

The action of the apparatus is as follows:—On air under pressure being admitted to the pressure box the pressure therein operates to exert a downward pressure on the float $b$ through the diaphragm $d$ and the spindle $r$, such pressure depending upon the upward pressure of the float, which depends on the amount same is submerged, it being obvious that the upward pressure of the float will increase as the quantity of liquid in the vessel increases and vice versa. When the pressure in the pressure box exceeds the upward pressure of the float on the diaphragm the escape valve will open and thereby reduce the pressure in the pressure box and allow the float to again close the escape valve. By this means a balance is arrived at whereby a definite pressure is maintained in the pressure box which gives a reading on the gage which is a measure of the depth or quantity of liquid in the vessel according as the gage is calibrated.

It will be seen that in this apparatus any rise of pressure in the pipe leading to the gage due to rise in temperature or to variation in barometric pressure is immediately corrected by the action of the escape valve under the control of the buoyant body in the liquid and that therefore the gage gives a correct reading under all atmospheric conditions.

What I claim as my invention and desire to secure by Letters Patent is:—

1. An apparatus for measuring the quantity of liquid in a vessel, comprising a float in said vessel, a pressure box located above said vessel, means for supplying air under pressure to said box, a pressure gage in connection with the pressure box, an inlet port in the pressure box for the admission of air under pressure, an outlet port in the pressure box, a flexible diaphragm forming one wall of the pressure box, a valve carried by said diaphragm operating to close the outlet port in the pressure box, and means for communicating the movement of the float in the vessel to the valve carried by said diaphragm.

2. An apparatus for measuring the quantity of liquid in a vessel, comprising a float in said vessel, a pressure box located above said vessel, means for supplying air under pressure to said box, a pressure gage in connection with said box, an inlet port in said box, an outlet port in said box, a valve closing said outlet port, a flexible diaphragm in said box, and a spindle connecting the float to said diaphragm.

3. An apparatus for measuring the quantity of liquid in a vessel, comprising a float in said vessel, a pressure box located above said vessel, means for supplying air under pressure to said box, a pressure gage in connection with said box, an inlet port in said box, an outlet port in said box, a valve closing said outlet port, a flexible diaphragm in said box, a spindle connecting the float with said diaphragm, and a spring for balancing the weight of the float.

4. An apparatus for measuring the quantity of liquid in a vessel, comprising a float in said vessel, a box—formed in two parts—located above said vessel, a flexible diaphragm forming the division between the two parts of said box, a pressure gage connected to the top part of said box, a port in the top part of said box for the admission of air under pressure into the upper part of said box, a port in the lower part of said box for the admission of air at atmospheric pressure, an outlet port in the upper part of said box, a valve carried by the diaphragm and adapted to open and close the outlet port in the upper part of said box, and a spindle connecting the float to the valve carried by the diaphragm.

5. An apparatus for measuring the quantity of liquid in a vessel, comprising a float in said vessel, a box—formed in two parts—located above said vessel, a flexible diaphragm forming the division between the two parts of said box, a pressure gage connected to the top part of said box, a port in the top part of said box for the admission of air under pressure into the upper part of said box, a port in the lower part of said box for the admission of air at atmospheric pressure, an outlet port in the upper part of said box, a valve carried by the diaphragm and adapted to open and close the outlet port in the upper part of said box, a spindle connecting the float to the valve carried by the diaphragm, and a spring for balancing the non-buoyant weight of the float.

In testimony whereof I have signed my name.

FREDERIC HOLLOCOOMBE CLIFT.